July 16, 1929.  I. L. DUNN ET AL  1,721,010
OIL RECOVERY AND GASOLINE EXTRACTION APPARATUS
Filed Aug. 2, 1926   2 Sheets-Sheet 2
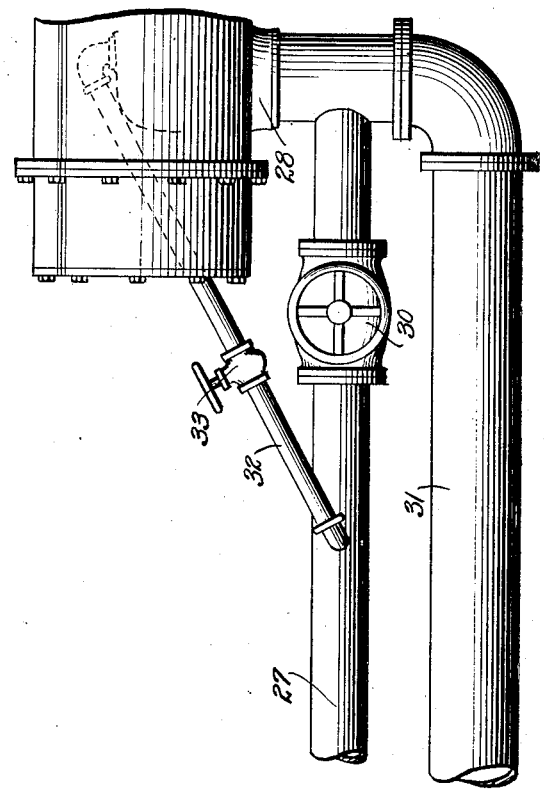
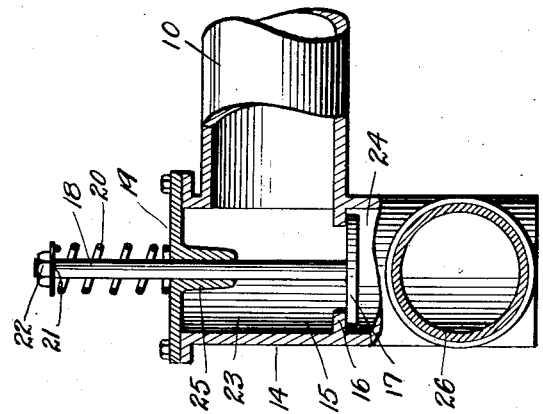
INVENTORS
Irwin L. Dunn and
Leslie C. Mingus.
BY
ATTORNEY Patented July 16, 1929.

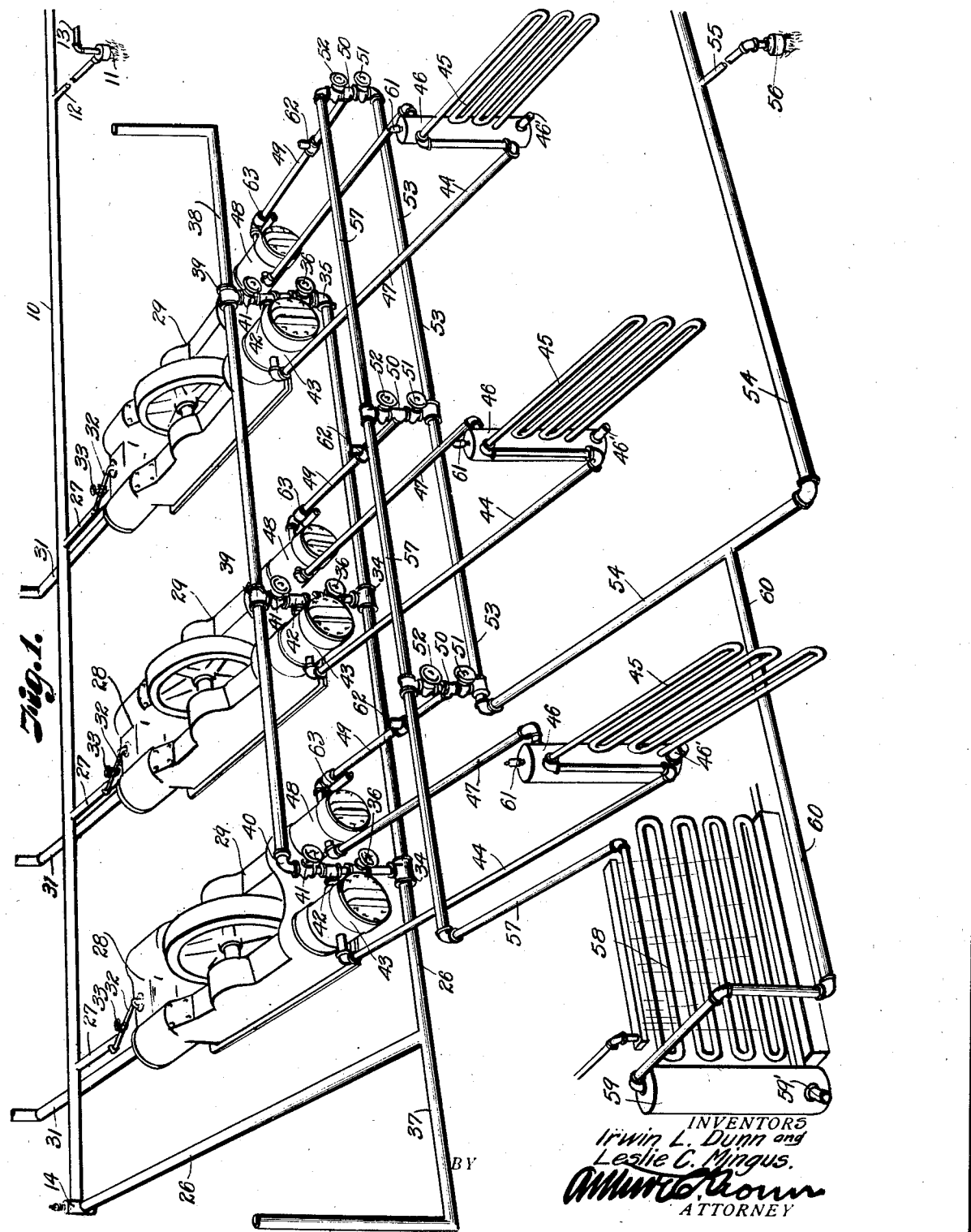

1,721,010

UNITED STATES PATENT OFFICE.

IRWIN L. DUNN AND LESLIE C. MINGUS, OF TULSA, OKLAHOMA, ASSIGNORS, BY MESNE ASSIGNMENTS, TO DUNN & LEWIS, OF TULSA, OKLAHOMA, A PARTNERSHIP COMPOSED OF IRWIN L. DUNN AND JAMES O. LEWIS.

OIL-RECOVERY AND GASOLINE-EXTRACTION APPARATUS.

Application filed August 2, 1926. Serial No. 126,564.

Our invention relates to the method of recovering oil and gas from wells and extracting gasoline from said gas, and to the apparatus for accomplishing this method.

It is the purpose of our invention to provide a new and improved method of recovering oil and gas from wells and extracting gasoline from said gas comprising the supplying of a fluid under pressure, such as air or a mixture of air and other gases, to a well or wells in an oil field so that the pressure of the fluid percolating through the oil sand will cause a flow of oil in another well or wells in the field, from which the oil is collected and the fluid mixture comprising gasoline-bearing gas and air is separately collected.

The collected fluid mixture of gasoline-bearing gas and air is then ordinarily compressed and the gasoline extracted in a well known manner, after which the fluid mixture remaining is returned to those wells that are utilized by supplying fluid under pressure to the oil sand.

While the method outlined above has been practiced prior to our present invention, it has been found always necessary to add air to the mixture in the continuous process in order to supply a sufficient volume of gaseous or fluid mixture to the wells to maintain a sufficient fluid pressure in the oil sand to carry out the method. It is the purpose of our invention to add the air in such quantity and at such points in the process as to not interfere with the efficient extraction of the gasoline from the fluid mixture and at the same time maintain a substantially constant supply of the fluid mixture with the air added to the well or wells that supply the same to the oil sand.

Ordinarily air is added to the mixture to increase the volume thereof before extracting the gasoline therefrom and this may be done in the manner as previously carried out in the process except that the amount of air added at this point is maintained below such a ratio that the mixture will not be diluted to an extent as to interfere with the efficient extraction of gasoline therefrom. In carrying out our process we separately compress air when it is necessary to add so much air to the mixture that it would interfere with the extraction of gasoline therefrom and add the separately compressed air to the mixture after the gasoline has been extracted from said mixture.

The amount of the gas and air mixture that flows from the wells varies considerably and while sometimes the same is of a sufficient quantity that only a small amount of air need be added which can be safely added without interfering materially with the gasoline extraction process, at other times the supply of the mixture from the wells decreases so materially that a comparatively very large volume of air must be added, of which only a small portion can be added before the gasoline is extracted from the mixture. It is accordingly obvious that the manner of supplying the air would be varied in accordance with the supply of air and gas mixture coming from the sand.

It is a further purpose of our invention to provide means whereby the air supplied in the method may be added at the desired point in the process and in the desired quantity. Preferably our improved apparatus comprises a plurality of compressors, each of which is provided with a separate air intake and fluid mixture intake conduit. The air intake conduit of each of said compressors is preferably connected with a separate air intake and with the fluid mixture intake leading from the oil field, and means is preferably provided for connecting the separate air supply intake or the fluid mixture intake associated with each of the compressors, independently, with the cylinders thereof, from the other compressors, so as to supply either air alone or the mixture coming from the sand to the compressors. Thus any proportion of the compressors can be utilized for either compressing air alone or the gaseous or fluid mixture coming from the field.

Sometimes it would be desirable to utilize all the compressors for compressing the mixture and supplying air to the mixture to increase the volume thereof so as to maintain the volume of said mixture discharged from the apparatus substantially uniform prior to compressing the mixture. At other times it may be desirable to operate one or more of the compressors entirely on air. It is a further purpose of our invention to so associate the gasoline extraction apparatus with the compressors that the compressor or compressors operating entirely on air can have the compressed air therefrom shunted around the extraction apparatus so as not to dilute the mixture therein. This is preferably accomplished by providing a cooling apparatus for each compressor that is inserted between the first and second stages of compression thereof; this cooling apparatus being air-cooled and providing a water-cooled apparatus that is common to all the compressors and a by-pass around said last-mentioned cooling coil with which any of the compressors may be connected to pass the air compressed by such compressors around said last-mentioned cooling coil. Suitable collecting means for the gasoline is, of course, provided in connection with each of the cooling devices.

In apparatus of the above mentioned character, the compressors are ordinarily operated by internal combustion engines and the gaseous mixture is utilized for operating said engines. However, as the richness of the combustible mixture coming from the field, as well as the pressure thereof, varies, it is another purpose of our invention to provide means for regulating the pressure in the supply pipe for said gaseous mixture leading to the internal combustion engines so as to maintain the same substantially constant.

Other objects and advantages of the invention will appear as the description of the accompanying drawings proceeds; however, we desire to have it distinctly understood that we do not intend to limit ourselves to the exact details shown or described but that we intend to include as part of our invention all such obvious changes and modifications of parts as would occur to a person skilled in this art and as would fall within the scope of the claims.

In the drawings:

Fig. 1 is a diagrammatic perspective view of our improved oil recovering and gasoline-extracting apparatus.

Fig. 2 is an enlarged sectional view of the regulating valve and portions of the conduits associated therewith.

Fig. 3 is a fragmentary plan view of a portion of one of the compressors showing the fuel supply connections therefor.

Referring in detail to the drawings:

Our improved apparatus comprises a fluid mixture supply conduit 10, leading from the oil field, the same being connected with wells such as the well 11 by means of suitable conduits 12 so as to collect the mixture of gas and air passing from the same in the said conduit 10. A suitable oil conduit 13 is also associated with the well 11 in any desired manner. At the extreme end portion of the conduit 10 a regulating valve 14 is provided; said valve 14 being shown more in detail in Fig. 2 and comprising a casing 15 having a valve seat 16 provided therein, against which the valve member 17 is adapted to engage. The valve member 17 is preferably disk-like in form and has a stem 18 extending upwardly therefrom through the cover plate 19 which is secured to the valve casing 15 in any desired manner.

Surrounding the portion of the valve stem 18 projecting above the cover plate 19 and bearing against said cover plate at one end thereof is a compression spring 20, the other end thereof engaging against a washer 21, which is seated against the nut 22, screw-threadedly engaging with the end of the stem 18. The compression of the spring 20 can be regulated by means of the nut 22 and it will be seen that the valve 17 will become unseated when the pressure reaches above a predetermined amount in the chamber 23, allowing the opening of the passage into lower chamber 24 of the valve. In order to guide the valve properly in its movements an inwardly-extending boss 25 is preferably provided on the cover 19, within which the stem 18 is slidingly received. The conduit 10 leads into the chamber 23 and a conduit 26 leads from the chamber 24.

From the conduit 10 a plurality of branches 27 extend, each of the branches leading to an internal combustion engine intake manifold 28 associated with the internal combustion engines provided for each of the compressors 29 to operate the same in a well known manner.

Each of the branch conduits 27 is provided with a valve member 30 and each of said branches leads into an air supply pipe 31, which leads into the intake manifold 28. Each of the branch conduits 27 is further provided with a relatively small supply pipe 32, extending from the same to the intake manifold 28; a valve 33 being provided in each of the pipes 32. The purpose of providing the arrangement of conduits and supply pipes for the internal combustion engines described above is to supply combustible mixture to the engines that is of substantially uniform richness. The richness of the mixture in the conduit 10 varies considerably under different conditions and if the same is extremely rich, it is desirable to shut off the valve 30 and utilize the pipe 32 and the valve 33 to supply the gaseous mixture to the intake manifold of the engine, the air supply being obtained from the conduit 31 which is unrestricted and always open to the outer air. If the mixture in the conduit 10 is extremely lean and the valve 33 has been opened as far as possible, the valve 30 is opened to add gas mixture to the air drawn in through the conduit 31, as described in our application filed August 2, 1926, Serial No. 126,565.

It will be seen that with the arrangement of valved supply pipes for the gaseous mixture described, a wide adjustment of the relative proportions of air and gaseous mixture can be obtained, the pressure being maintained substantially uniform by means of the valve 14.

The conduit 26 is provided with a plurality of T's 34 and an L 35 at the end thereof from which connections lead to the valves 36. An air inlet pipe 37 is also provided leading into the conduit 26. A separate air intake pipe 38 is provided from which the T's 39 and the L 40 lead to valves 41, there being one valve 36 and one valve 41 associated with each of the compressors 29, the outlet ends of said valves being connected through the T's 42 with the low pressure cylinders 43 of the compressors 29. From each of the low pressure cylinders a conduit 44 leads to a cooling coil 45, said coil being air and water cooled and being associated with a gasoline accumulating tank 46, commonly known as a "scrubber", in the usual manner so that as the gasoline is condensed in the coil 45, it will accumulate in the tank 46, from which it may be withdrawn in any desired manner, as through the conduit 46'.

Leading from each of the accumulating or scrubber tanks 46 is a conduit 47, which leads to the higher stage or high pressure cylinders 48 of each of the compressors 29. From each of the high pressure cylinders 48, which comprise the second stage of compression of the compressors 29, is a conduit 49; said conduits 49 each leading to a T 50. Connected on opposite sides of each of the T's 50 are the valves 51 and 52. The valves 51 all lead into a conduit 53 which is connected with the conduit 54 leading to the oil field and which is provided with the branches 55 connected with one or more wells 56 so as to supply the compressed fluid to the oil sand, through which the same percolates and returns at least partially through the well 11, and similar wells, to the conduit 10.

Each of the valves 52 leads to the conduit 57 which leads to a water-cooled condensing coil 58, connected with an accumulating or scrubber tank 59 of the gasoline extracting apparatus, the gasoline passing off from the tank 59 through the conduit 59'. From the tank 59 the discharge conduit 60 leads to the conduit 54, thus returning the gaseous or fluid mixture from which the gasoline has been extracted to the wells in the oil field that supply the pressure for removing the oil from the oil-bearing sand.

In carrying out our improved method if a relatively large supply of the gaseous mixture is being obtained from the field, the compressors are all connected with the conduit 26 by opening the valves 36 and closing the valves 41. When this is done all the valves 51 are closed and the valves 52 are opened and all of the mixture of gasoline-bearing gas and air along with the air drawn in through the inlet 37 passes through the coils 45, the accumulating or "scrubber" tanks 46 and also the coil 58 and accumulating or "scrubber" tank 59. When a smaller supply of the gaseous or fluid mixture is obtained from the field, one of the valves 36 leading to one of the compressors 29 is closed and the valve 41 associated with said compressor is opened and the valve 52 associated therewith is closed; the other compressors operating in the same manner as previously described but the last-mentioned compressor 29 then operating to pass the air which is obtained from the conduit 38 through its cooling coil 45 and accumulating or "scrubber" tank 46, then through its high pressure cylinder 48 and then through the valve 51 through the by-pass conduit 53 direct to the conduit 54, thus avoiding the water-cooled coil 58 of the gasoline extraction apparatus. No harm is done by passing the air through the coil 45 as it aids in cooling the same and maintaining the same at a lower temperature in the cylinder 48.

It will be obvious that the proportion of compressors operating on air and on the gaseous mixture can be varied in this manner to obtain the desired content of gasoline-carrying gas without diminishing the supply of gaseous mixture supplied to the field and yet keeping the compressors operating at full capacity and the gas extraction apparatus at full efficiency.

In order to provide against an excessive pressure developing in the tanks 46, safety valves 61 are provided thereon. Safety valves 62 are also preferably provided in the pipes 49 so as to take care of any excessive pressure that might develop therein, as, for example, in case the valves 51 and 52 associated therewith are both accidentally left closed. Preferably a thermostatic control device 63 is also asocsiated with each of the cylinders 48 in the conduit 49 leading therefrom, said device controlling the ignition of the engine 29 associated with the compressor of which the cylinders 48 form a part to stop the operation of said engine, in a well known manner, should an excessive temperature develop at this point.

What we claim and desire to secure by Letters Patent is:

1. In combination with a compressor and an engine for operating the compressor, a gas line leading to the compressor, a branch leading from the gas line for supplying the engine, and an automatic valve in the gas line between the branch and compressor limiting supply to the compressor to surplus over fuel requirements of the engine.

2. In combination with a compressor and an engine for operating the compressor, a gas line leading to the compressor, a branch leading from the gas line for supplying the engine, an automatic valve in the gas line between the branch and compressor limiting supply to the compressor to surplus over fuel requirements of the engine, and an air intake to the line between the valve and compressor.

3. In combination with a compressor and an engine for operating the compressor, a gas line leading to the compressor, a branch leading from the gas line for supplying the engine, an automatic valve in the gas line between the branch and compressor limiting supply to the compressor to surplus over fuel requirements of the engine, and a free air intake to the line between the valve and compressor.

4. In combination with a battery of compressors having individual engines, separate gas and air lines having selective valved connection with the respective compressors, branches on the gas line for supplying the engines, and an automatic valve in the gas line limiting supply from said line to the compressors to surplus of combined fuel requirements of all of the engines.

5. In combination with a battery of compressors having individual engines, separate gas and air lines having selective valved connection with the respective compressors, branches on the gas line for supplying the engines, an automatic valve in the gas line limiting supply from said line to the compressors to surplus of combined fuel requirements of all of the engines, a pressure medium supply line, a collecting line, a condenser connected with the collecting line, high pressure lines leading from the compressors having branches to the supply and collecting lines, and valves for selectively delivering compressed fluid medium through the branches in the high pressure lines to the supply or collecting line.

In testimony whereof we affix our signatures.

IRWIN L. DUNN.
LESLIE C. MINGUS.